(12) United States Patent
Walley et al.

(10) Patent No.: US 7,941,159 B2
(45) Date of Patent: *May 10, 2011

(54) POSITION DETERMINATION USING RECEIVED BROADCAST SIGNALS

(75) Inventors: John Walley, Ladera Ranch, CA (US);
Nambirajan Seshadri, Irvine, CA (US);
Scott Bibaud, Santa Ana, CA (US)

(73) Assignee: Broadcom Corporation, Irvine, CA (US)

( * ) Notice: Subject to any disclaimer, the term of this patent is extended or adjusted under 35 U.S.C. 154(b) by 731 days.

This patent is subject to a terminal disclaimer.

(21) Appl. No.: 11/761,450

(22) Filed: Jun. 12, 2007

(65) Prior Publication Data

US 2008/0311870 A1    Dec. 18, 2008

Related U.S. Application Data

(60) Provisional application No. 60/931,918, filed on May 25, 2007.

(51) Int. Cl.
*H04W 24/00* (2009.01)

(52) U.S. Cl. ............... 455/456.1; 455/404.2; 455/432.1; 455/433; 455/456.2; 455/456.3

(58) Field of Classification Search ........ 455/456.1–457
See application file for complete search history.

(56) References Cited

U.S. PATENT DOCUMENTS

| | | | |
|---|---|---|---|
| 5,365,450 A | 11/1994 | Schuchman et al. | |
| 5,465,088 A | 11/1995 | Braegas | |
| 6,081,780 A | 6/2000 | Lumelsky | |
| 6,107,939 A | 8/2000 | Sorden | |
| 6,211,817 B1 | 4/2001 | Eschenbach | |
| 6,219,385 B1 | 4/2001 | Weinberg | |
| 6,370,475 B1 | 4/2002 | Breed et al. | |
| 6,704,650 B1 | 3/2004 | Fuller et al. | |
| 7,319,877 B2 * | 1/2008 | Krumm et al. | ............. 455/456.3 |
| 7,495,609 B1 | 2/2009 | Woo et al. | |
| 2002/0101374 A1 | 8/2002 | Mutch et al. | |

(Continued)

FOREIGN PATENT DOCUMENTS

JP    2000137065 A    5/2000

OTHER PUBLICATIONS

A. Youssef: Computing Location from Ambient FM Radio Signals; IEEE Wireless Communications and Networking Conference; vol. 2; p. 824-829; Mar. 2005.

*Primary Examiner* — Dai A Phuong
(74) *Attorney, Agent, or Firm* — Garlick Harrison & Markison; Holly L. Rudnick

(57) ABSTRACT

A radio device that is capable of positioning itself within a broadcast radio system includes a receiver operable to receive a plurality of broadcast radio signals, each broadcast from a respective one of a plurality of broadcast radio signal sources. The radio device further includes processing circuitry operable to determine respective call station identification information for each of the broadcast radio signal sources from the broadcast radio signals, measure respective signal quality characteristics for each of the received broadcast radio signals, identify station position data associated with each of the broadcast radio signal sources from the respective call station identification information, and calculate a location of the radio device using the signal quality characteristics and station position data associated with at least three broadcast radio signal sources.

25 Claims, 5 Drawing Sheets

U.S. PATENT DOCUMENTS

| | | |
|---|---|---|
| 2003/0122711 A1 | 7/2003 | Panasik et al. |
| 2003/0144007 A1* | 7/2003 | Johansson et al. ............ 455/456 |
| 2004/0119638 A1 | 6/2004 | Fagan et al. |
| 2004/0198279 A1 | 10/2004 | Antitia et al. |
| 2004/0220722 A1 | 11/2004 | Taylor |
| 2005/0184905 A1 | 8/2005 | Kobayashi |
| 2005/0206559 A1 | 9/2005 | Diggelen et al. |
| 2005/0227703 A1* | 10/2005 | Cheng ........................ 455/456.1 |
| 2007/0132639 A1 | 6/2007 | Korneluk et al. |
| 2007/0201421 A1* | 8/2007 | Huseth .......................... 370/338 |
| 2008/0222705 A1* | 9/2008 | Goodmon et al. ................ 726/4 |
| 2008/0238766 A1 | 10/2008 | Morgan |
| 2009/0146870 A1 | 6/2009 | Thome et al. |
| 2010/0120422 A1* | 5/2010 | Cheung et al. ................ 455/434 |

* cited by examiner

| | TOWER POSITION DATA | |
|---|---|---|
| TOWER ID | TOWER COORDINATES | TOWER TX POWER |
| TOWER 1 | $X_1, Y_1$ | TX 1 |
| TOWER 2 | $X_2, Y_2$ | TX 2 |
| TOWER 3 | $X_3, Y_3$ | TX 3 |
| ⋮ | ⋮ | ⋮ |

FIG.3

| TOWER 1 SIGNAL MEASUREMENT DATA | |
|---|---|
| MEASURED VALUE | RADIAL DISTANCE (R) FROM TOWER 1 |
| M1 | R1 |
| $M_N$ | $R_N$ |
| $M_M$ | $R_M$ |
| ⋮ | ⋮ |

FIG.4

POSITION DETERMINATION USING RECEIVED BROADCAST SIGNALS

CROSS REFERENCE TO RELATED PATENTS

This U.S. application for patent claims the benefit of the filing date of U.S. Provisional patent application entitled, POSITION DETERMINATION USING RECEIVED BROADCAST SIGNALS, having Ser. No. 60/931,918, filed on May 25, 2007, which is incorporated herein by reference for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention is related generally to position determination, and more particularly to position determination using broadcast radio signals.

2. Description of Related Art

It is often desirable, and sometimes necessary, for a person to know their current location. If the person has a cell phone, conventional wireless communications networks currently provide a number of different techniques for positioning the cell phone within the wireless network. One technique uses the cell identity combined with either the Round Trip Time (RTT), Timing Advance (TA) or measured signal strength to determine an area within the cell that the mobile terminal is located. Another technique uses signals from multiple neighboring base stations to calculate the mobile terminal's location based on the Time Difference of Arrival (TDOA), Angle of Arrival (AOA) or received signal strength of the signals. Still another technique used in code division multiple access (CDMA) networks uses signal timing to position the mobile terminal in the CDMA network.

However, if the person does not have a cell phone or is an area that does not provide cellular service, there are only limited options to obtain the person's location. One option is the well-known Global Positioning System (GPS). However, the GPS method requires adequate reception from a minimum of four satellites to accurately determine the spatial position of an object in three dimensions. Obtaining an adequate signal from four satellites is often difficult depending on the terrain and physical environment. For example, large obstructions, thick tree cover, tall buildings, canyons, underground tunnels and other obstacles may cause a satellite to become obscured and thus preclude an accurate GPS position.

Therefore, a need exists for an alternative positioning method when traditional cellular and GPS techniques are not available.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 3 is a table illustrating exemplary RDS position data for use in positioning a radio device in accordance with the present invention;

FIG. 4 is a table illustrating further exemplary RDS position data for use in positioning in a radio device in accordance with the present invention;

DETAILED DESCRIPTION OF THE INVENTION

Figure 1:
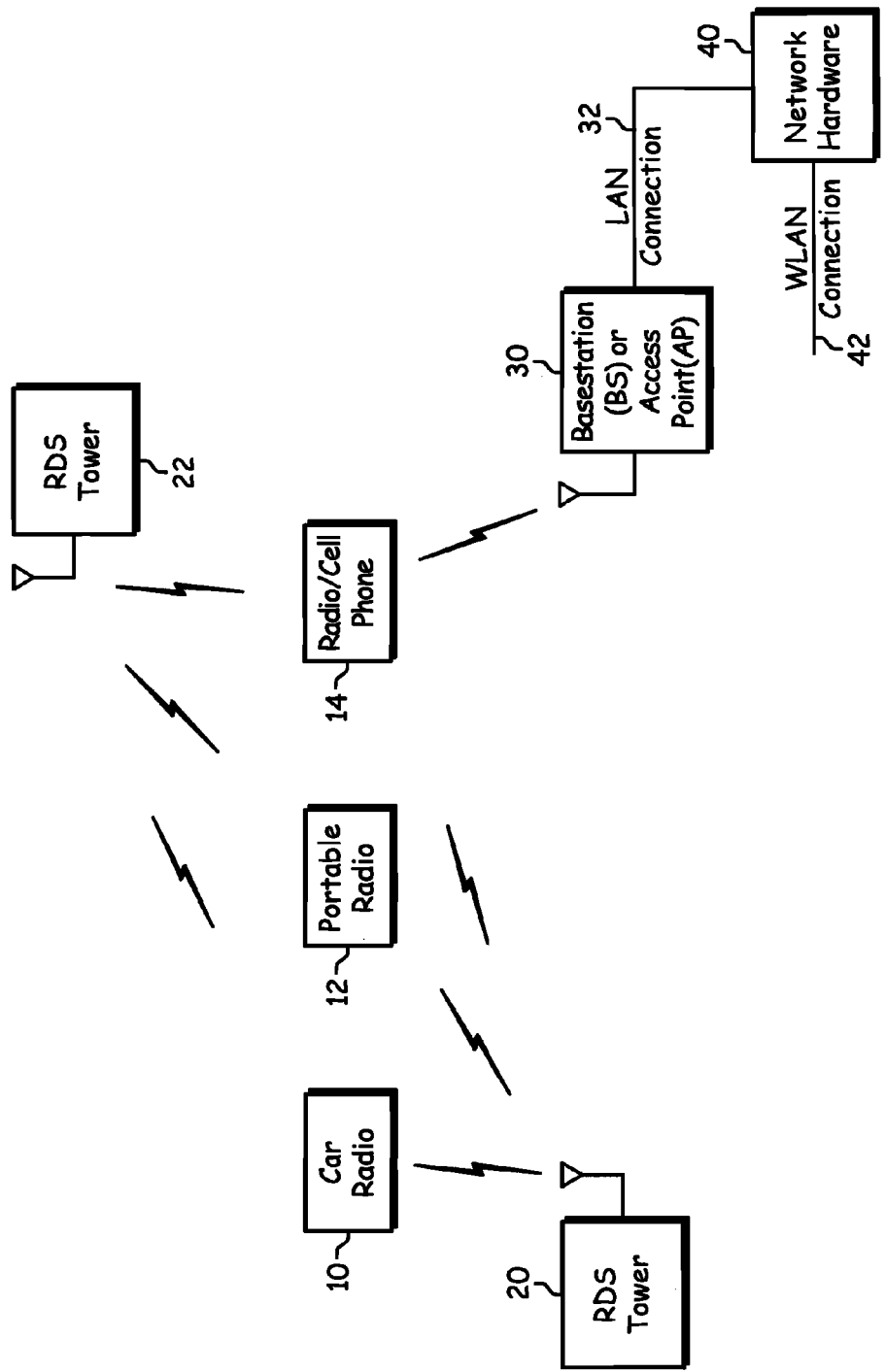
FIG. 1 is a schematic block diagram illustrating a broadcast system that includes a plurality of radio data system (RDS) broadcast towers and a plurality of radio devices in accordance with the present invention.

FIG. 1 is a schematic block diagram illustrating a broadcast system that includes a plurality of broadcast radio towers 20, 22 and a plurality of radio devices 10, 12 and 14 in accordance with the present invention. Each of the broadcast radio towers 20, 22 may be a Radio Data System (RDS) tower, as shown, or a non-RDS tower.

The radio devices may be, for example, car radios 20, portable radios 12, cellular telephones incorporating radio receivers (radio/cell phone) 14 and/or other wireless devices that include radio receivers. Each of the radio devices 10, 12 and 14 is operable to receive a plurality of broadcast radio signals broadcast from one or more of the broadcast radio towers 20, 22. As described herein, the broadcast radio signals are frequency modulated (FM) signals. However, in other embodiments, the broadcast radio signals may use modulations different than FM.

Each of the FM broadcast radio signals is used by the radio devices 10, 12 and 14 to determine call station identification information identifying the broadcast radio towers 20, 22 that are broadcasting the broadcast radio signals. In an exemplary embodiment, each of the FM broadcast radio signals includes radio data system (RDS) data that identifies, among other things, the call station identity (e.g., call sign or station name) of the RDS broadcast tower 20, 22 transmitting the FM broadcast radio signal. However, in other embodiments, the call station identification information can be included in another form of station broadcast or inferred based upon the approximate location of the radio device 10, 12 and 14 and reception at certain frequencies. For example, upon receiving appreciable signal strength at 95.5 MHz FM in Orange County, Calif., the radio device 10, 12, 14 is able to discern that the call station identity is "KLOS."

As known to one skilled in the art, the Radio Data System (RDS) is a standard from the European Broadcasting Union for sending small amount of digital information using conventional FM radio broadcasts. In the U.S., a similar standard has been developed, known as the Radio Broadcast Data System (RBDS). However, as used herein, the term RDS includes both the European RDS standard and the U.S. RBDS standard. In the U.S., FM radio stations are allocated 200 kHz of bandwidth (in Europe, it is 100 kHz). RDS is a separate radio signal (subcarrier) that fits within the station's frequency allocation. The RDS subcarrier carries digital information at a frequency of 57 kHz with a data rate of 1187.5 bits per second. The RDS data is transmitted simultaneously with the standard FM stereo (or monophonic) radio broadcast.

More specifically, the RDS operates by adding data to the baseband signal that is used to modulate the radio frequency carrier. The baseband signal consists of a mono audio component including the combination of the left and right stereo speaker components that is transmitted at the normal audio frequencies up to 15 kHz, a stereo difference signal subcarrier that is amplitude modulated as a double sideband suppressed carrier signal at 38 kHz and a pilot tone at 19 kHz that is used to enable the radio receiver demodulator to recreate the 38 kHz subcarrier to decode the stereo difference signal. The stereo difference signal is above the audio hearing range, and therefore, does not detract from the normal mono signal. The RDS data is placed above the stereo difference signal on a 57 kHz RDS subcarrier that is locked onto the pilot tone. The RDS subcarrier is phase modulated, typically using a form of modulation called Quadrature Phase Shift Keying (QPSK). By phase modulating the RDS data and operating the RDS subcarrier at a harmonic of the pilot tone, potential interference with the audio signal is reduced.

In operation, when a user tunes the receiver of one of the radio devices 10, 12, 14 to a particular FM channel, the radio device 10, 12, 14 receives an FM broadcast signal from a particular RDS broadcast tower 20 or 22 that is broadcasting at that carrier frequency. If the received FM broadcast signal includes RDS data, the radio device 10, 12, 14 demodulates the RDS data to identify the station that the receiver is tuned to. The call station identity is often displayed on a display of the radio device 10, 12, 14 to enable the user to visually identify the station. For example, if an RDS-enabled receiver is currently tuned to a carrier frequency including RDS data identifying a particular radio station with a call sign of "KMMM" and a station name of "The Music," the display on the radio device 10, 12, 14 can display not only the carrier frequency, but also the call sign and the station name.

In accordance with embodiments of the invention, the call station identification information included within the broadcast RDS data or otherwise determined from the broadcast radio signal can further assist in positioning the radio device 10, 12, 14 within the broadcast system. The geographical (physical) location of each of the broadcast radio towers 20, 22 is fixed. Therefore, with knowledge of the geographical coordinates (latitude and longitude) of the tower 20, 22 from which a particular FM radio signal is broadcast, the location of a particular radio device 10, 12, 14 can be determined. For example, coordinate data identifying the geographical coordinates of one or more broadcast radio towers 20, 22 can be cross-referenced with station identification information included in the RDS data of, or otherwise determined from, a received FM radio signal to identify the broadcast radio tower (e.g., tower 20) broadcasting the received FM radio signal and the geographical coordinates of that broadcasting tower 20.

Once the geographical coordinates of the broadcasting tower 20 are ascertained, the location of the radio device (e.g., device 10) receiving the broadcast radio signal from that tower 20 can be determined using any suitable locating algorithm. In an exemplary embodiment, the transmit power of the broadcasting tower 20 is compared to the signal strength of the received broadcast FM radio signal to calculate the location of the radio device 10. As a rough estimate, the measured signal strength can be considered to be inversely proportional to the distance between the radio device 10 and the tower 10.

Taking measurements from multiple towers 20, 22 can improve the accuracy of the radio device 10 location. For example, using signal strength measurements from a single tower merely positions the radio device 10 to a radial distance between the radio device 10 and the tower (i.e., the radio device 10 is located at any point along the circumference of a circular area surrounding the tower, in which the circular area has a radius equal to the distance between the radio device and the tower). Using signal strength measurements from two towers positions the radio device 10 to one of two points where the circumferences of the two circular areas overlap. However, using signal strength measurements from three or more towers enables the use of a triangulation technique that pinpoints the location of the radio device. Accuracy can be further improved by time averaging multiple measurements taken of each received radio signal.

Numerous variations of signal strength locating algorithms exist. For example, when the tower 20, 22 is far away from the mobile device 10, the position accuracy predicted from that measurement is typically less than when the tower 20, 22 is closer. Therefore, measurements taken from towers 20, 22 with shorter distances to the radio device 10 can be weighted more heavily than measurements taken from towers 20, 22 that are further away from the radio device 10. As another example, if only one or two broadcast towers in the area have an RDS broadcast capability or are otherwise capable of providing call station identification information to the radio device 10, the radio device 10 can approximate its location with the one or two RDS signals, and then resolve the remaining uncertainty using the signal strength of other non-RDS broadcast stations.

Turning again to FIG. 1, in embodiments in which the radio device is a combined radio/cell phone 14, the broadcast system further includes various components of a wireless communication system for communicating with the cellular telephone component of the combined radio/cell phone 14 (hereinafter referred to for simplicity as the "cellular telephone"). For example, as shown in FIG. 1, such a wireless communication system may include a base station or access point (AP) 30 and a network hardware component 40. The base station or AP 30 is coupled to the network hardware component 40 via local area network (LAN) connection 32. The network hardware component 40, which may be a router, switch, bridge, modem, system controller, etc., provides a wide area network connection 42 for the wireless communication system. The base station or access point 30 has an associated antenna or antenna array to communicate with the cellular telephone. Typically, the cellular telephone registers with the base station or access point 30 to receive services from the wireless communication system. For direct connections (i.e., point-to-point communications), the cellular telephone communicates directly via an allocated channel.

Typically, base stations are used for cellular telephone systems and similar systems, while access points are used for in-home or in-building wireless networks. For example, access points are typically used in Bluetooth systems. Regardless of the particular type of wireless communication system, the cellular telephone and the base station or access point 30 each include a built-in transceiver (transmitter and receiver) for modulating/demodulating information (data or speech) bits into a format that comports with the type of wireless communication system. There are a number of well-defined wireless communication standards (e.g., IEEE 802.11, Bluetooth, advanced mobile phone services (AMPS), digital AMPS, global system for mobile communications (GSM), code division multiple access (CDMA), local multipoint distribution systems (LMDS), multi-channel-multipoint distribution systems (MMDS), and/or variations thereof) that could facilitate such wireless communication between the cellular telephone and a wireless communication network.

In an exemplary embodiment, the cellular telephone component of the radio/cell phone 14 can facilitate the positioning of the radio/cell phone 14. For example, in some applications, it may be desirable to wirelessly communicate data necessary for positioning to the cellular telephone. As an example, the network hardware component 40 may provide RDS tower geographical coordinate information to the cellular telephone. As another example, the network hardware component 40 may provide approximate locations or areas, along with various frequencies and associated call station identification information for towers within the location/area. Upon receiving the downloaded data, the cellular telephone can store the data in a non-volatile memory within the radio/cell phone 14 for use in a subsequent positioning of the radio/cell phone 14 in the broadcast system. In other applications, it may be desirable to wirelessly communicate position-related data from the radio/cell phone 14 to the wireless communication network for further processing and/or forwarding of the data. As an example, the cellular telephone can provide the collected signal strength measurements to the internal transceiver within the cellular telephone to communicate the signal strength measurements to the network hardware component 40 using any available wireless communication standard (e.g., IEEE 802.11x, Bluetooth, et cetera). The network hardware component 40 can process the signal strength measurements and/or forward the signal strength measurements to another network device to determine the location of the radio/cell phone 14 within the broadcast network.

Figure 2:
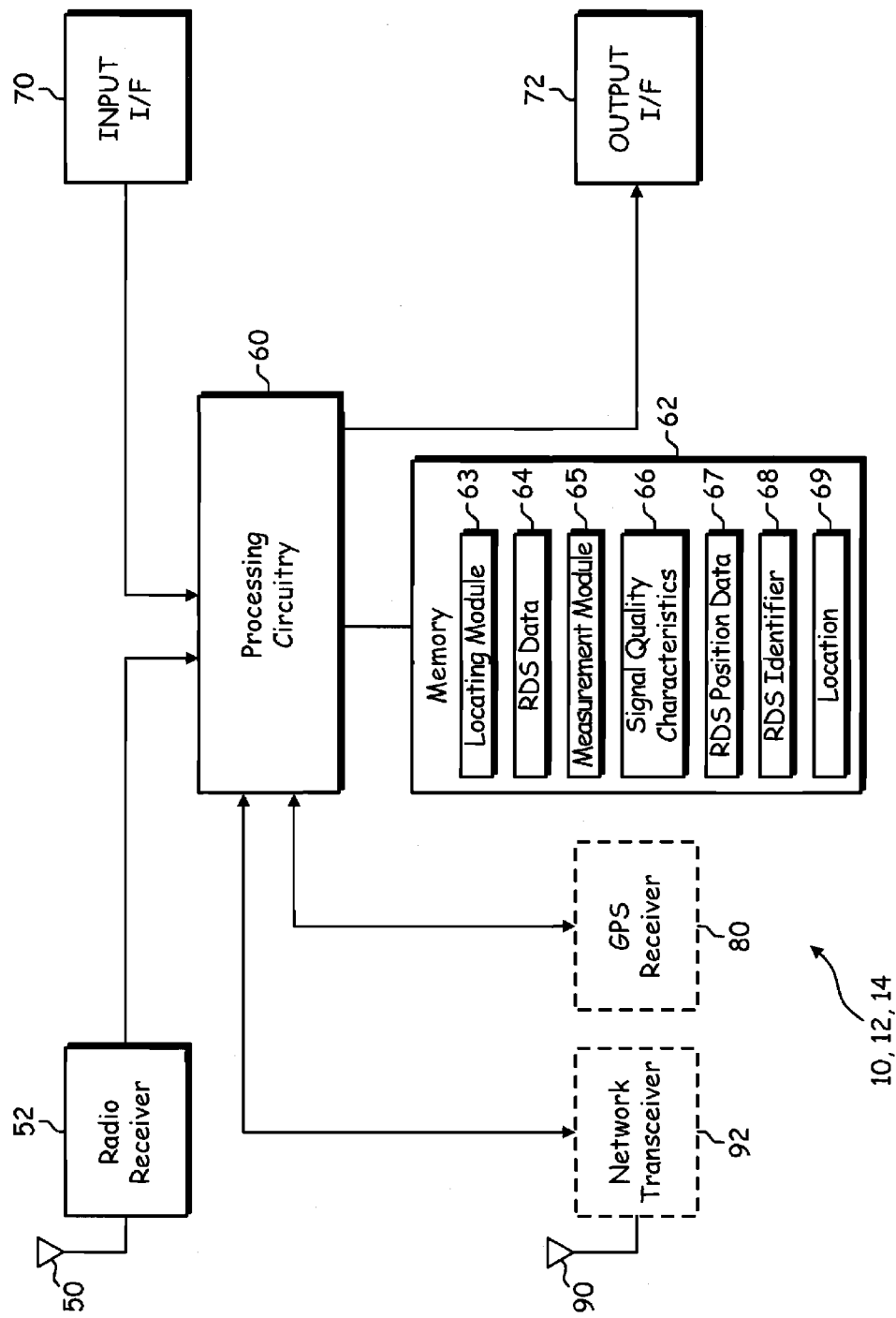
FIG. 2 is a schematic block diagram illustrating an exemplary radio device in accordance with the present invention.

FIG. 2 is a schematic block diagram an exemplary radio device 10, 12, 14 in accordance with the present invention. The radio device 10, 12, 14 includes an antenna 50, a radio receiver 52, processing circuitry 60 and a memory 62. The radio device 10, 12, 14 may further include an optional network transceiver 92 and associated antenna 90 for communicating with a wireless (cellular) communication network and/or an optional Global Positioning System (GPS) receiver 80 that is capable of positioning the radio device 10, 12, 14 using a GPS technique. In embodiments in which the radio device 10, 12, 14 includes the network transceiver 92, the transceiver 92 may be built-in or an externally coupled component.

The processing circuitry 60 is communicatively coupled to the memory 62. The memory 62 stores, and the processing circuitry 60 executes, operational instructions corresponding to at least some of the functions illustrated herein. For example, in one embodiment, the memory 62 maintains a locating module 63, Radio Data System (RDS) data 64 (e.g., broadcast RDS data received by the radio device 10, 12, 14), a measurement module 65, signal quality characteristics 66 (e.g., signal strength measurements), RDS position data 67 (e.g., coordinate data associated with RDS broadcast towers), one or more RDS identifiers 68 (e.g., call station identification information containing call signs and/or names of one or more radio stations) and location information 69 (e.g., one or more locations of the radio device 10, 12, 14).

The measurement module 65 includes instructions executable by the processing circuitry 60 for measuring signal quality characteristics associated with one or more received broadcast FM radio signals. The locating module 63 includes instructions executable by the processing circuitry 60 for calculating the current location of the radio device 10, 12, 14.

Thus, the measurement module 65 and locating module 63 each provide respective instructions to the processing circuitry 60 during positioning of the radio device 10, 12, 14.

The processing circuitry 60 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 62 may be a single memory device or a plurality of memory devices. Such a memory device may be a read-only memory, random access memory, volatile memory, non-volatile memory, static memory, dynamic memory, flash memory, and/or any device that stores digital information. Note that when the processing circuitry 60 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In addition, as one of average skill in the art will appreciate, the radio device of FIG. 2 may be implemented using one or more integrated circuits. For example, the radio receiver 52 may be implemented on a first integrated circuit, while the processing circuitry 60 is implemented on a second integrated circuit, and the remaining components, i.e., the network transceiver 92 and GPS receiver 80 may be implemented on a third integrated circuit. As an alternate example, the radio receiver 52 and network transceiver 92 may be implemented on a single integrated circuit. As yet another example, the radio receiver 52 and processing circuitry 60 may be implemented on a single integrated circuit. Further, memory 62 may be implemented on the same integrated circuit as processing circuitry 60 or on a different integrated circuit.

The radio device 10, 12, 14 further includes an input interface 70 and an output interface 72, each communicatively coupled to the processing circuitry 60. The output interface 72 provides an interface to one or more output devices, such as a display, speakers, etc. The input interface 70 provides one or more interfaces for receiving user input via one or more input devices (e.g., mouse, keyboard, etc.) from a user operating the radio device 10, 12, 14. For example, such user input can include a request to position the radio device 10, 12, 14.

In operation, the radio device 10, 12, 14 receives a broadcast FM radio signal via the antenna 50, which was broadcast by an RDS tower. The antenna 50 provides the FM radio signal to the radio receiver 52, where the receiver 52 processes the FM radio signal to demodulate the received FM radio signal and recover the stereo audio signals (left and right speaker audio signals). As described above, at the transmitter (RDS tower), the audio signals for the left and right speakers are added to produce the mono audio signal and subtracted from one another to produce the stereo difference signal. Assuming the receiver 52 is a stereo receiver, the receiver 52 includes an FM demodulator to demodulate the mono audio signal and an additional stereo demodulator to demodulate the stereo difference signal. Since the stereo difference signal is phase locked to the 19 kHz pilot tone included in the received FM radio signal, the pilot tone is used to control the frequency and phase of a 38 kHz oscillator in the stereo demodulator of the radio receiver 52. Thus, the radio receiver 52 is able to demodulate both the mono audio signal and stereo difference signal and then combine the two demodulated signals to recover the original left and right stereo audio signals.

In addition, the radio receiver 52 further includes an RDS demodulator that operates to decode the RDS data 64 included within the received FM radio signal. The original RDS data is transmitted by the RDS tower at a data rate of 1187.5 bits per second, which is equal to the frequency of the RDS subcarrier divided by 48. This data rate allows the RDS demodulator to operate synchronously, which reduces problems with spurious signals in the demodulator. The RDS data is transmitted in groups consisting of four blocks. Each block contains a 16 bit information word and a 10 bit check word. The 10 bit check word enables the RDS demodulator to detect and correct errors and also provides a method for synchronization. With a data rate of 1187.5 bits per second, approximately 11.4 groups can be transmitted each second.

The data groups are structured so that different data can be transmitted as efficiently as possible. However, the coding structure is such that messages that require frequent repeating normally occupy the same position within the groups. For example, the first block in a group normally contains the program identification (PI) code (e.g., the station identity). Thus, the RDS demodulator is able to demodulate the first block in a received data group to determine the RDS station identifier of the RDS tower that broadcasted the received data group. The decoded RDS data 64 including the RDS station identifier 68 is provided to the processing circuitry 60 for storage within the memory 62. In addition, the decoded RDS data 64 including the RDS station identifier 68 can be provided to the output I/F 72 for display on the radio device 10, 12, 14.

Furthermore, in accordance with embodiments of the present invention, the RDS station identifier 68 can also be used to position the radio device 10, 12, 14 within the broadcast system. In an exemplary operation, either automatically or upon receipt of a request to position the radio device 10, 12, 14 via the input I/F 70 or the network transceiver 92, the measurement module 65 provides instructions to the processing circuitry 60 to obtain signal quality characteristic measurements 66 of one or more received broadcast FM radio signals. A single signal quality characteristic measurement for each received radio signal can be obtained or multiple signal quality characteristic measurements for each received radio signal can be averaged over time to improve the accuracy of the characterization.

There are several characteristics of a radio signal that can be used to determine the location of its source. One characteristic is the signal strength of the received signal. The received power (average amplitude) of a radio signal decays exponentially relative to the distance between the source of the signal and the point of reception. Therefore, by measuring the signal strength of a received signal transmitted from a known RDS tower location with a known transmit power, the signal strength measurements can be used to determine the distance between the radio device 10, 12, 14 and the broadcasting RDS tower. Another characteristic is the signal to noise (SNR) ratio of the received signal. The numerator of the SNR ratio is the signal power of the received radio signal, while the denominator of the SNR ratio is the noise power of the received radio signal.

Once the signal quality characteristic measurements 66 have been taken, the signal quality characteristic measurements 66 can either be provided to a network device via the network transceiver 92 for calculation of the location of the radio device 10, 12, 14 by the network device or used internally by the radio device 10, 12, 14 in determining its own location. In the former embodiment, both the signal quality characteristic measurements 66 and the RDS data 64 identifying the source of the radio signals associated with the signal quality characteristic measurements are transmitted to the network device. In the latter embodiment, in order to calculate its own location, the radio device 10, 12, 14 must have knowledge of the geographical (physical) location of the RDS tower from which a particular FM radio signal is broadcast. Therefore, RDS position data 67 identifying the geographical coordinates and associated transmit powers of one or more RDS towers are stored in the memory 62.

In one embodiment, the RDS position data 67 is pre-determined and maintained within the memory 62 of the radio device 10, 12, 14. For example, referring now to FIG. 3, the RDS position data 67 can be maintained as a table 300 of tower position data that includes the identifier 310 (e.g., PI code) of the RDS tower, the geographical coordinates 320 of the RDS tower (x, y) and the transmit power 330 of the RDS tower.

Returning to FIG. 2, in another embodiment, the RDS position data 67 associated with a particular received broadcast radio signal is included within the RDS data 64 that is broadcast by the RDS tower. In yet another embodiment, the RDS position data 67 is downloaded from a network device via the network transceiver 92. Therefore, upon receipt of instructions from the measurement module 65, the processing circuitry 60 compares the RDS station identifier 68 included in the RDS data 64 of a received FM radio signal with the stored RDS position data 67 to identify the RDS tower broadcasting the received FM radio signal, the geographical coordinates of that broadcasting RDS tower and the transmit power of that RDS tower.

Once the geographical coordinates and transmit power of one or more broadcasting RDS towers are ascertained and the signal quality characteristic measurements 66 for each broadcasting RDS tower for which radio signals are received by the radio device 10, 12, 14 have been taken, the locating module 62 provides instructions to the processing circuitry 60 to calculate the location of the radio device 10, 12, 14 using any available locating algorithm. In an exemplary embodiment, the locating module 62 provides instructions to the processing circuitry 60 to compare the transmit power of a particular broadcasting RDS tower to the measured signal strength or measured SNR of the received broadcast FM radio signal to determine the distance between that particular RDS tower and the radio device 10, 12, 14. Using signal quality characteristic measurements of received FM radio signals broadcast from three or more different RDS towers enables the location of the radio device 10, 12, 14 to be triangulated. The locating module 62 can provide instructions to the processing circuitry 60 to use all received RDS FM radio signals or only a certain number of received RDS FM radio signals or to weight the received RDS FM radio signals based on the signal quality of the received RDS FM radio signals, distance between the RDS towers and the radio device, knowledge of "good" RDS towers from received data or history and/or observed signal characterization over time to determine which RDS towers provide consistent signal quality.

For example, in one embodiment, the exponential decay of the received signal as determined by the difference between the measured signal strength and the transmit power is used by the processing circuitry 60 to calculate an estimated distance between the radio device 10 and the RDS tower. In another embodiment, the RDS position data 67 further includes distance information identifying the distance between the radio device 10 and the RDS tower 10 as a function of the measured signal strength. For example, as shown in FIG. 4, the RDS position data 67 can further include a respective table 400 of signal measurement data for each RDS tower that includes the measured signal strength ($M_1$-$M_M$) and the associated radial distance (R) from the RDS tower ($R_1$-$R_M$). The signal quality characteristic measurements can be mapped to the table 400 to determine a best fit. In embodiments in which the calculation of the location of the radio device 10, 12, 14 is performed by a network device, the network device can maintain the table 400 and apply the signal quality characteristic measurements 66 provided by the radio device 10 to the table 400 to determine the best fit.

Returning to FIG. 2, in one embodiment, the signal strength RDS position data 67 is pre-determined and maintained within the memory 62. For example, the radio device 10, 12, 14 can include the GPS receiver 80 to determine the location of the test radio device with each signal measurement, thereby populating the table 400 shown in FIG. 4 for later use by the radio device 10. The GPS receiver 80 may also be included within a test radio device to populate the table and download it to other radio devices. In another embodiment, the signal measurement RDS position data 67 associated with a particular received broadcast radio signal is included within the RDS data 64 that is broadcast by the RDS tower. In yet another embodiment, the signal measurement RDS position data 67 is downloaded from a network device via the network transceiver 92.

Figure 5:
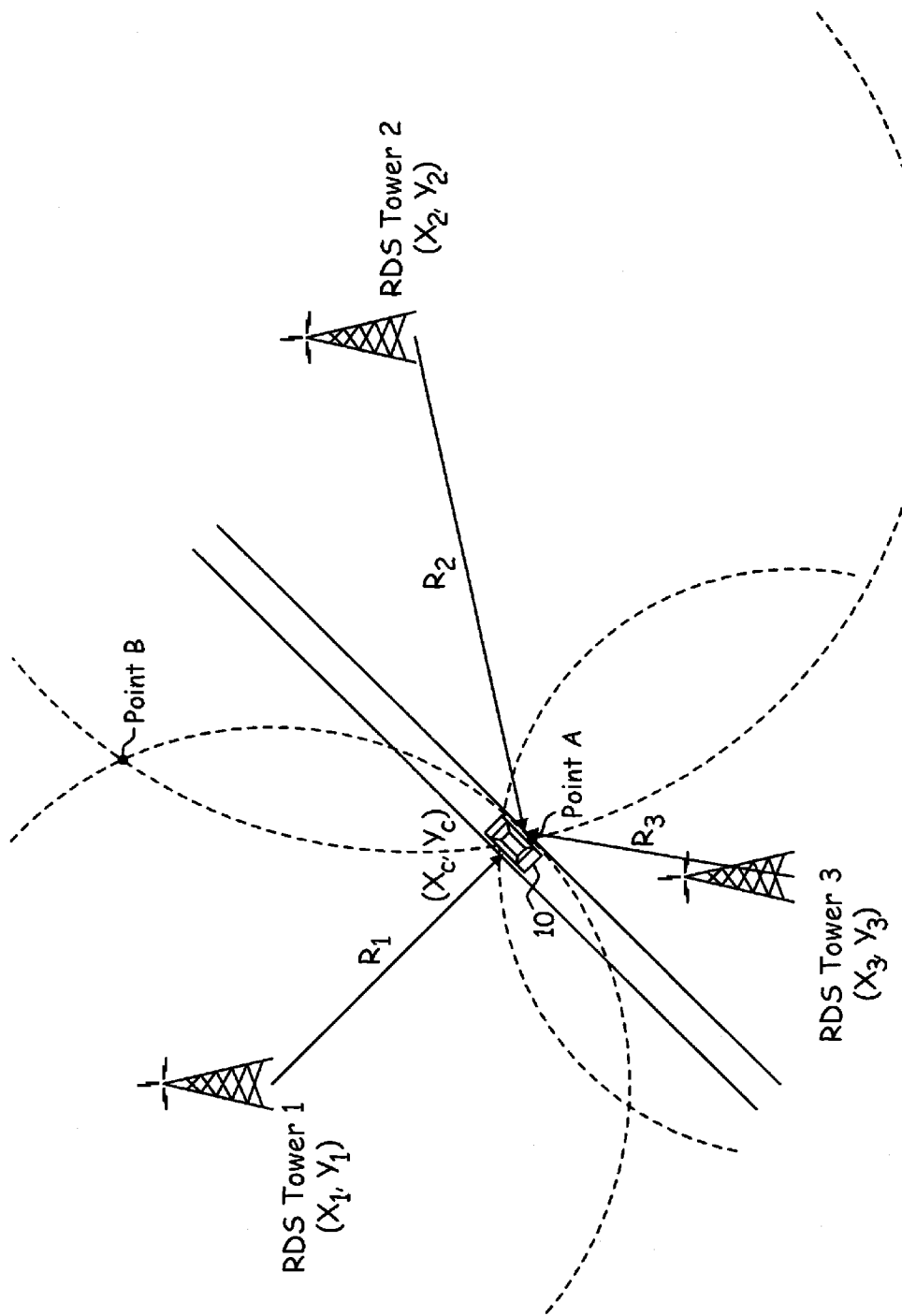
FIG. 5 is a schematic diagram illustrating a triangulation method for positioning a radio device in accordance with the present invention.

Referring now to FIG. 5, there is illustrated an exemplary triangulation technique. FIG. 5 shows a broadcast system having three RDS towers, RDS Tower 1, RDS Tower 2 and RDS Tower 3, each at a known location. As can be seen in FIG. 5, RDS Tower 1 is located at geographical coordinates $x_1, y_1$, RDS Tower 2 is located at geographical coordinates $x_2, y_2$ and RDS Tower 3 is located at geographical coordinates $x_3, y_3$. A car having an RDS-capable car radio 10 is traveling within the broadcast system. To determine the location ($x_c, y_c$) of the car, the car radio 10 measures the signal quality characteristics of FM radio signals broadcast from RDS Tower 1, RDS Tower 2 and RDS Tower 3.

The signal quality characteristic measurements from each RDS tower enable the car radio 10 to position itself along a circumference of respective circular areas surrounding each RDS tower, in which each area has a radius equal to the distance between the car radio 10 and the respective RDS tower. For example, based on the signal quality characteristic measurements taken by the car radio of the radio signal broadcast from RDS Tower 1, the geographical location of RDS Tower 1 and the transmit power of RDS Tower 1, the car radio 10 can determine the radial distance $R_1$ between the car radio 10 and RDS Tower 1. Thus, the car radio 10 is able to discern that its location is at any point along the circumference of a circular area surrounding RDS Tower 1, in which the circular area has a radius $R_1$ equal to the distance between the radio device and the RDS tower. Using signal strength measurements from two RDS towers, e.g., RDS Tower 1 and RDS Tower 2 positions the car radio 10 to one of two points A or B where the circumferences of the two circular areas overlap.

However, using signal strength measurements from three or more RDS towers, e.g., RDS Tower 1, RDS Tower 2 and RDS Tower 3 enables the use of a triangulation technique that pinpoints the location of the car radio 10. Triangulation of the location of the car radio 10 can be improved using more than three RDS Towers. For example, when using N RDS Towers, N circles can be created based on the signal strength measurements taken from each of the N Towers, and the location of the car radio 10 can be identified as the point (geographical position) that is closest to the intersection of all of the N circles.

In embodiments in which there are only one or two RDS Towers, but there are other non-RDS Towers in the area, the signal strength measurements taken from the RDS Tower(s) can be used to determine a "course" location of the car radio 10. Thereafter, using signal strength measurements taken from non-RDS Towers enables the car radio 10 to test remaining possible locations (e.g., when using measurements from both RDS Tower 1 and RDS Tower 2, the possible locations include points A or B), and pick the one that best fits the non-RDS measurement data.

Figure 6:
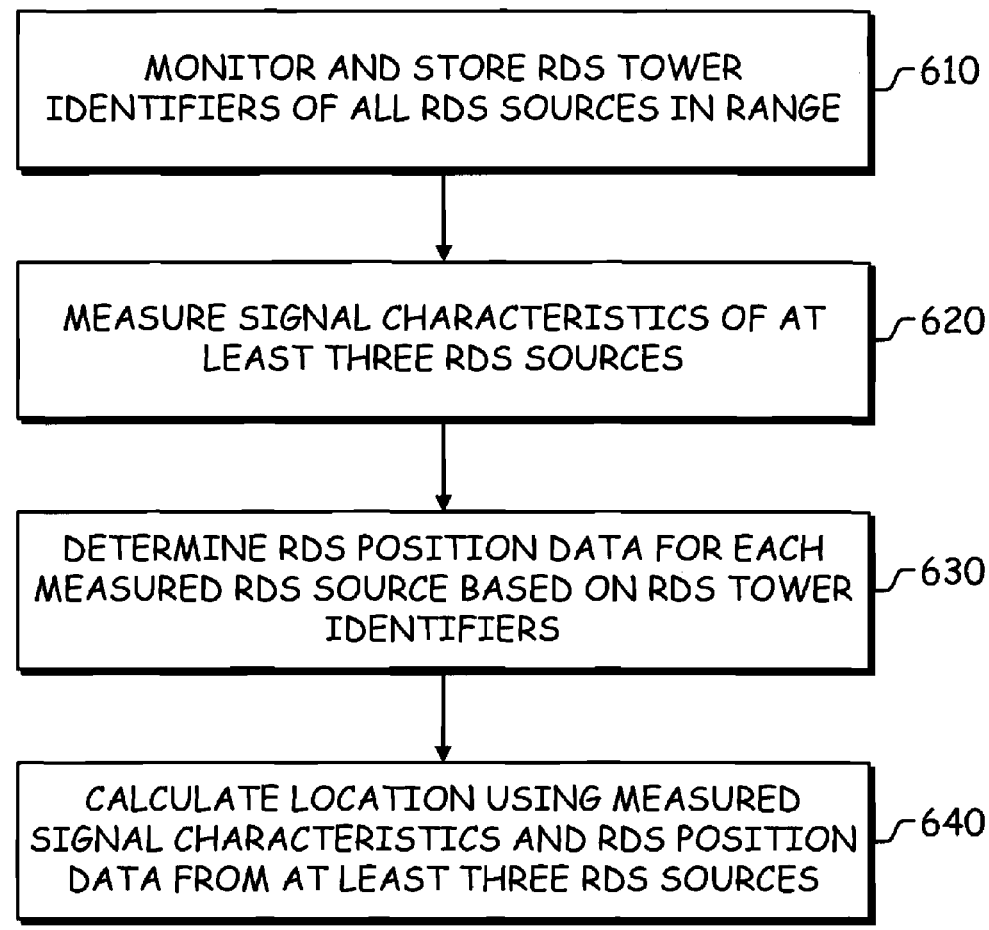
FIG. 6 is a logic diagram of a method for positioning a radio device using FM broadcast radio signals in accordance with the present invention.

FIG. 6 is a logic diagram of a method 600 for positioning a radio device using FM broadcast radio signals in accordance with the present invention. The process begins at step 610, where the radio device monitors and stores RDS tower identifiers (e.g., PI codes or other station identification information) of all of the RDS FM radio signals (i.e., all RDS sources) within range of the radio device. The process continues at step 620, where the radio device measures the signal quality characteristics of broadcast FM radio signals received from at least three RDS sources (or from non-RDS sources if only one or two RDS sources are in the area). At step 630, the radio device determines RDS position data for each measured RDS source based on the received RDS tower identifiers. For example, the radio device can access a table containing RDS tower identifiers, associated geographical RDS tower coordinates and associated RDS tower transmit powers.

The process ends at step 640, where the radio device calculates its location using the measured signal quality characteristics and the RDS position data from the RDS sources. For example, in one embodiment, the radio device can compare the transmit power of a particular broadcasting RDS tower to the measured signal strength or measured SNR of the received broadcast FM radio signal to determine the distance between that particular RDS tower and the radio device. In another embodiment, the radio device can compare the measured signal strength to a table containing signal strength measurements and associated radial distances (R) for a particular RDS tower. Using signal quality characteristic measurements of received FM radio signals broadcast from three or more different RDS towers enables the location of the radio device to be triangulated.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has further been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The preceding discussion has presented a radio device and method of operation thereof. As one of ordinary skill in the art will appreciate, other embodiments may be derived from the teaching of the present invention without deviating from the scope of the claims.

What is claimed is:

1. A radio device, comprising:
a receiver configured to receive a plurality of broadcast radio signals within the FM frequency band, each broadcast from a respective one of a plurality of broadcast radio signal sources; and
processing circuitry coupled to said receiver and configured to:
determine respective call station identification information associated with each of said plurality of broadcast radio signals from each of said plurality of broadcast radio signals, each said call station identification information identifying a respective one of said plurality of broadcast radio signal sources;
measure respective signal quality characteristics for each of said plurality of broadcast radio signals from said respective broadcast radio signals, identify station position data associated with each of said broadcast radio signal sources from said respective call station identification information, said station position data indicating a respective location of each of said broadcast radio signal sources, and
calculate geographical coordinates representing a location of said radio device using said signal quality characteristics and said station position data associated with at least three of said broadcast radio signal sources,
wherein said processing circuitry is configured to multiply a respective weighting factor to each of said signal quality characteristics to produce weighted signal quality characteristics and utilize said weighted signal quality characteristics to calculate said location of said radio device, each said respective weighting factor being predetermined based on prior radio device positioning using said broadcast radio signals from said broadcast radio signal sources.

2. The radio device of claim 1, wherein at least one of said plurality of broadcast radio signals includes radio data system (RDS) data; and wherein said processing circuitry is further operable to decode said RDS data within said at least one of said broadcast radio signals to determine a respective RDS identifier for each of said at least one respective broadcast radio signal sources and to use said respective RDS identifiers to identify said respective station position data.

3. The radio device of claim 2, wherein said station position data is included within said RDS data broadcast by said broadcast radio signal sources.

4. The radio device of claim 2, wherein said processing circuitry is further operable to measure respective non-RDS signal quality characteristics for one or more non-RDS broadcast radio signals broadcast from non-RDS signal sources and utilize said non-RDS signal quality characteristics to assist in the calculation of said location of said radio device.

5. The radio device of claim 1, further comprising:
a memory storing said station position data.

6. The radio device of claim 1, further comprising:
a network transceiver in communication with a wireless network to download said station position data therefrom.

7. The radio device of claim 1, wherein each said station position data includes coordinate data identifying the geographical coordinates of said respective broadcast radio signal source and transmit power data identifying the transmit power of said respective broadcast radio signal source.

8. The radio device of claim 7, wherein each said station position data further includes signal measurement data that associates said measured signal quality characteristics for said respective broadcast radio signal source with a radial distance from said respective broadcast radio signal source.

9. The radio device of claim 8, wherein said processing circuitry is further operable to calculate said signal measurement data using said measured signal quality characteristics, said coordinate data and said transmit power data.

10. The radio device of claim 8, wherein said processing circuitry is operable to calculate said location of said radio device using at least one triangulation of said signal measurement data from at least three of said broadcast radio signal sources.

11. The radio device of claim 8, further comprising:
a Global Positioning System (GPS) receiver operable to populate a table containing said signal measurement data for each of said broadcast radio signal sources.

12. The radio device of claim 1, wherein said signal quality characteristics of each of said plurality of broadcast radio signals include a received signal strength indicator (RSSI) or a signal-to-noise ratio (SNR).

13. The radio device of claim 1, wherein said processing circuitry is operable to average a plurality of said signal quality characteristics for each of said plurality of broadcast radio signals and utilize average signal quality characteristics to calculate said location of said radio device.

14. The radio device of claim 1, wherein said processing circuitry is further operable to select at least three of said broadcast radio signal sources based on said signal quality characteristics for each of said broadcast radio signal sources.

15. A method for determining a location of a radio device using broadcast radio signals, comprising steps of:
- receiving a plurality of broadcast radio signals within the FM frequency band, each broadcast from a respective one of a plurality of broadcast radio signal sources;
- determining respective call station identification information associated with each of said plurality of broadcast radio signals from each of said received plurality of broadcast radio signals, each said call station identification information identifying a respective one of said plurality of broadcast radio signal sources;
- measuring respective signal quality characteristics for each of said plurality of broadcast radio signals from said respective broadcast radio signals;
- identifying station position data associated with each of said broadcast radio signal sources from said respective call station identification information, said station position data indicating a respective location of each of said broadcast radio signal sources; and
- calculating geographical coordinates representing said location of said radio device using said signal quality characteristics and said station position data associated with at least three of said broadcast radio signal sources, wherein said calculating includes:
- multiplying a respective weighting factor to each of said signal quality characteristics to produce weighted signal quality characteristics, and utilizing said weighted signal quality characteristics to calculate said location of said radio device, each said respective weighting factor being predetermined based on prior radio device positioning using said broadcast radio signals from said broadcast radio signal sources.

16. The method of claim 15, wherein at least one of said plurality of broadcast radio signals includes radio data system (RDS) data; and wherein said step of determining said call station identification information further comprises the step of:
- decoding said RDS data within said at least one of said broadcast radio signals to determine a respective RDS identifier for each of said at least one respective broadcast radio signal sources for use during said step of identifying said respective station position data.

17. The method of claim 16, wherein said step of identifying said station position data further comprises the step of:
- extracting said station position data from said RDS data broadcast by said broadcast radio signal sources.

18. The method of claim 15, wherein said step of identifying said station position data further comprises the step of:
- downloading said station position data from a wireless network.

19. The method of claim 15, wherein each said station position data includes coordinate data identifying the geographical coordinates of said respective broadcast radio signal source and transmit power data identifying the transmit power of said respective broadcast radio signal source.

20. The method of claim 19, wherein each said station position data further includes signal measurement data that associates said measured signal quality characteristics for said respective broadcast radio signal source with a radial distance from said respective broadcast radio signal source.

21. The method of claim 20, wherein said step of identifying said station position data further comprises the step of:
- calculating said signal measurement data using said measured signal quality characteristics, said coordinate data and said transmit power data.

22. The method of claim 20, wherein said step of calculating said location of said radio device further comprises the step of:
- calculating said location of said radio device using at least one triangulation of said signal measurement data from at least three of said broadcast radio signal sources.

23. The method of claim 20, further comprising the step of:
- using a Global Positioning System (GPS) receiver to populate a table containing said signal measurement data for each of said broadcast radio signal sources.

24. The method of claim 15, wherein said signal quality characteristics of each of said plurality of broadcast radio signals include at least one of a received signal strength indicator (RSSI) or a signal-to-noise ratio (SNR).

25. The method of claim 15, wherein said step of calculating said location of said radio device further comprises the steps of:
- averaging a plurality of said signal quality characteristics for each of said plurality of broadcast radio signals; and
- utilizing average signal quality characteristics to calculate said location of said radio device.

* * * * *